Oct. 15, 1968　　　　　J. A. WAGLE　　　　　3,405,889
VERTICAL LIFT VEHICLE
Filed Oct. 20, 1966

INVENTOR.
Joseph A. Wagle
BY
Paul Fitzpatrick
ATTORNEY

United States Patent Office 3,405,889
Patented Oct. 15, 1968

3,405,889
VERTICAL LIFT VEHICLE
Joseph A. Wagle, New Augusta, Ind., assignor to General Motors Corporation, Detroit, Mich., a corporation of Delaware
Filed Oct. 20, 1966, Ser. No. 588,024
4 Claims. (Cl. 244—12)

ABSTRACT OF THE DISCLOSURE

A vertical takeoff vehicle includes a column in which an engine is mounted, a fan at the top of the vertical column, four vertical walls radiating from the column, and a lifting body defined by triangular surfaces extending downwardly and outwardly from the column between the walls. Vanes are provided to deflect the air flowing from the trailing edges of the lifting body into a vertical direction or toward the axis of the vehicle. A cargo carrier is suspended from the column by a pivoting and extensible link.

---

My invention is directed to a flying machine of a vertical takeoff and landing type. The principal purpose of my invention is to provide a simple cargo carrying device capable of lifting and carrying relatively heavy loads in relation to the size of the power plant and capable of dispensing with landing strips. To some extent this description would apply to the usual helicopter, but my device avoids the complications inherent in helicopters and uses a simple ducted fan and fixed lifting body arrangement to provide the lifting force.

Objects of the invention are to provide improved structure for the utilization of a lifting fan for direct lift, provide a flying transport vehicle in which ease of loading and unloading is outstanding, and provide a vertical lift vehicle with improved means for control.

The nature of my invention and the advantages thereof will be apparent to those skilled in the art from the succeeding detailed description of the preferred embodiment of the invention and the accompanying drawings.

Figure 1:
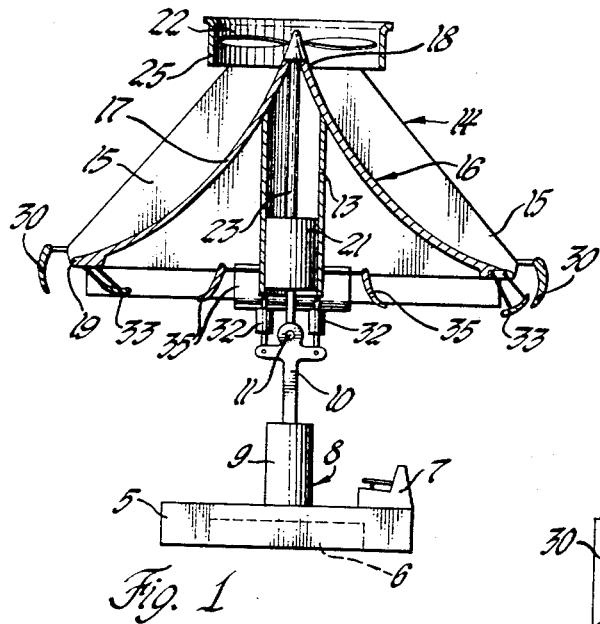
FIGURE 1 is an elevation of a vehicle with parts cut away and in section.
Figure 2:
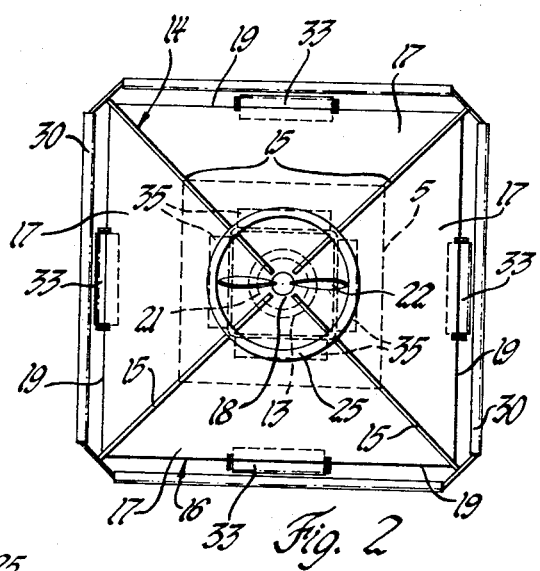
FIGURE 2 is a plan view.
Figure 3:
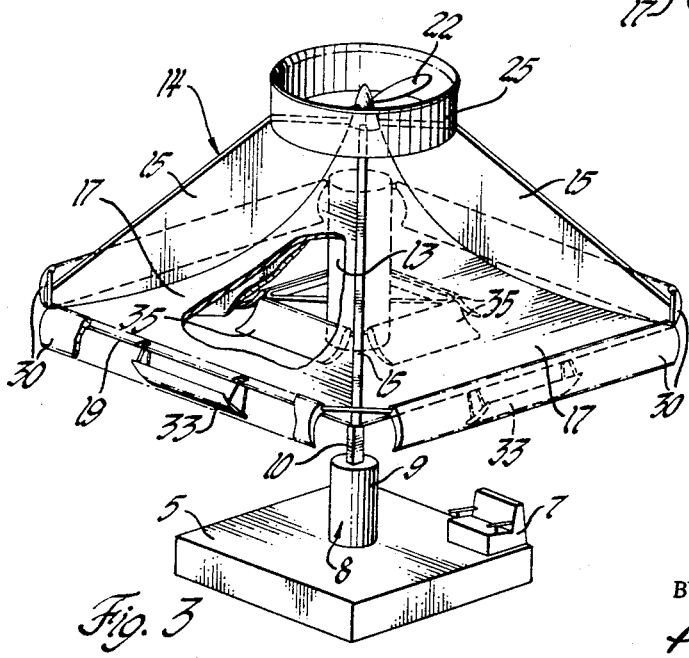
FIGURE 3 is an axonometric view with parts cut away.

The vehicle comprises a passenger or cargo carrying body 5 which may be a simple rectangular box or platform or may be any desired type of enclosed structure or a cargo lifting hook and landing gear arrangement. The body 5 encloses a fuel tank 6 and mounts a pilot's seat and control station schematically indicated at 7. A mast 8 comprising a base portion 9 and an upper portion 10 is fixed to the center of the platform 5. Parts 9 and 10 of the mast may telescope so that the platform 5 is farther spaced from the lifting body, to be described, when the aircraft is in operation.

The mast portion 10 is swiveled at 11 to a hollow center column 13 which mounts a lifting body indicated generally at 14. The column 13, which may be of circular cross section, bears four vertical radiating walls 15, spaced 90° apart around the axis of column 13 in this embodiment. The lifting body comprises a surface 16 defined by four curved panels 17 each of which diverges from an apex 18 to a trailing edge 19. In the illustrated device each of the panels 17 is of approximately right triangular form in plan view and extends between two adjacent radiating walls 15. An engine 21, which may be a gas turbine engine, mounted within the column 13, drives a propeller 22 mounted at the apex 18 of the lifting body by a shaft 23. The propeller or fan 22 is of a ducted type, being enclosed within a stationary shroud 25 mounted on the upper end of the radiating walls 15.

When the vehicle is in operation, the engine 21 drives propeller 22 which blows air over the outer surface 16 of the lifting body. Because of the velocity imparted to the air by the propeller, it is at lower pressure than the air below the lifting body and the result is a differential pressure creating an upward force on the lifting body. Preferably, the lifting body decreases in steepness from the apex toward the trailing edge or, in other words, the panels 17 are concave on their outer surfaces in a vertical plane. This configuration causes the slip stream from the propeller to be diverted gradually from the vertical direction to something in the order of a 45° to 60° angle to the vertical as it reaches a trailing edge. Also, as the air stream spreads out over the diverging panel 17 between the walls 15, the thickness of the high velocity air stream diminishes.

Fixed air deflectors 30 extend around the base of the lifting body parallel to but spaced from the trailing edge or edges 19. These deflectors, which are of curved airfoil configuration, deflect the air stream into a generally vertical direction, and the air stream engaging the deflectors exerts a lifting effect on the body.

Two means for maneuvering or control of the aircraft are provided and preferably both are used, although it is possible to omit one. Hydraulic cylinders, screw jacks, or other actuators 32 are connected between the mast 8 and the column 13 so that the lifting body may be tilted to provide a horizontal component of thrust for movement of the vehicle from point to point. Also, aerodynamic means may be provided for varying the lift around the body so as to tilt the vehicle and provide a lateral component of lift or thrust. An air redirecting flap 33 is provided across the central part of the span of each trailing edge. These air redirecting flaps may be selectively moved as indicated between the two positions shown in FIGURE 1; an ineffective position as shown at the left where they are out of the air stream from the propeller and an effective position as shown at the right where the redirecting flap diverts some of the air stream toward the column 13 and into engagement with a diffuser 35 which acts to redirect the air upward into the space defined between the panel 17 and two of the walls 15. This tends to lift the side of the lifting body at which the redirecting flap is moved outwardly into the air stream. Any conversion of velocity of air into static head underneath the lifting body tends to lift the body. Any or all the flaps may be moved to either position by suitable operating mechanism (not shown).

It will be clear that the structure may be variously modified; for one thing, the lifting body could be of circular cross section. However, it is desirable to retain the vertical walls 15 and, for best control using the redirecting flaps, at least three flaps and three walls 15 are needed. If the lifting body is of circular cross section, the air deflector 30 would be of annular form spaced uniformly from the circular trailing edge of the lifting body.

The detailed description of the preferred embodiment of the invention for the purpose of explaining the principles thereof is not to be considered as limiting or restricting the invention, since many modifications may be made by the exercise of skill in the art.

I claim:

1. An aircraft symmetrical with respect to an essentially vertical axis comprising, in combination, a column extending along said axis, at least three essentially vertical walls extending from, and circumferentially spaced around, the said column, a lifting body diverging downward and outward from the said axis disposed around said column and intersecting said walls, the lifting body comprising a number of sections each extending between adjacent walls and having an apex at the top of the section and a trailing edge remote from the apex, the said walls extending upward above the upper surface of the lifting body and extending substantially to the trailing edges, means at the top of the column effective to blow air downward and outward over the upper surface of the lifting body, turning vane means adjacent the trailing edges configured to turn the blown air flowing from the trailing edges toward a direction parallel to the said axis, and a cargo carrying body suspended from the column below the lifting body.

2. An aircraft as recited in claim 1 including also additional movable turning vane means operable to deflect air flowing from the trailing edges toward the said axis.

3. An aircraft as recited in claim 1 in which the said walls extend below the lifting body and divide the space under the lifting body into a number of zones, one zone corresponding to each section of the lifting body, and including means operable to deflect air flowing from each trailing edge into the corresponding zone.

4. An aircraft as recited in claim 1 including also a telescoping mast connecting the cargo carrier to the column.

References Cited

UNITED STATES PATENTS

| | | | |
|---|---|---|---|
| 2,978,206 | 4/1961 | Johnson | 244—23 |
| 3,034,747 | 5/1962 | Lent | 244—73 X |
| 3,036,797 | 5/1962 | Agusta | 244—137 |
| 3,041,009 | 6/1962 | Wharton | 244—12 |
| 3,096,044 | 7/1963 | Gould | 244—12 |
| 3,276,723 | 10/1966 | Miller et al. | 244—12 |

MILTON BUCHLER, *Primary Examiner.*

T. W. BUCKMAN, *Assistant Examiner.*